(12) United States Patent
Moessinger

(10) Patent No.: US 7,497,479 B2
(45) Date of Patent: Mar. 3, 2009

(54) CONNECTING MEANS AND FILTER DEVICE WITH SUCH A CONNECTING MEANS

(75) Inventor: Klaus Moessinger, Obersulm (DE)

(73) Assignee: Argo-Hytos GmbH, Kraichtal (DE)

( * ) Notice: Subject to any disclaimer, the term of this patent is extended or adjusted under 35 U.S.C. 154(b) by 388 days.

(21) Appl. No.: 11/259,742

(22) Filed: Oct. 25, 2005

(65) Prior Publication Data

US 2006/0108800 A1 May 25, 2006

(30) Foreign Application Priority Data

Oct. 29, 2004 (EP) .................................. 04025740

(51) Int. Cl.
  *F16L 37/00* (2006.01)
(52) U.S. Cl. .................... 285/305; 285/321; 210/232
(58) Field of Classification Search ................ 285/400, 285/403, 321, 305; 210/232
  See application file for complete search history.

(56) References Cited

U.S. PATENT DOCUMENTS

| | | | | |
|---|---|---|---|---|
| 2,969,994 A | * | 1/1961 | Jacobs et al. | 285/321 |
| 3,980,805 A | * | 9/1976 | Lipari | 385/321 |
| 4,009,896 A | * | 3/1977 | Brewer | 285/305 |
| 4,632,436 A | * | 12/1986 | Kimura | 285/305 |
| 5,632,512 A | * | 5/1997 | Guitoneau | 285/321 |
| 5,890,750 A | * | 4/1999 | Channell et al. | 285/321 |
| 5,954,448 A | * | 9/1999 | Shim | 403/291 |
| 6,050,500 A | | 4/2000 | Ensworth | |
| 6,808,211 B2 | * | 10/2004 | Hofmann et al. | 285/305 |
| 6,997,486 B2 | * | 2/2006 | Milhas | 285/305 |
| 7,316,431 B1 | * | 1/2008 | Broersma | 285/399 |
| 7,338,093 B2 | * | 3/2008 | Bilstein et al. | 285/307 |
| 2002/0104980 A1 | | 8/2002 | Jainek | |

FOREIGN PATENT DOCUMENTS

| | | |
|---|---|---|
| DE | 100 17 679 | 9/2001 |
| EP | 571286 A1 * | 11/1993 |
| EP | 1 103 752 | 5/2001 |
| FR | 2528533 | 6/1982 |
| GB | 2 350 656 | 12/2000 |
| WO | WO 00/66930 | 11/2000 |

* cited by examiner

*Primary Examiner*—David E Bochna
(74) *Attorney, Agent, or Firm*—Lipsitz & McAllister, LLC

(57) ABSTRACT

The invention relates to a connecting device having a first pipe connecting piece, a second pipe connecting piece and a securing part. The two pipe connecting pieces are adapted to be connected to one another in a releasable and fluid-tight manner by the securing part. The first pipe connecting piece has at least one recess on the outside, and the second pipe connecting piece has a collar and an outer piece of pipe, which between them form an annular space bounded on one side in the axial direction and which accommodates a sealing element. The outer piece of pipe has at least one aperture. The first pipe connecting piece is adapted to be introduced into the annular space. The securing part has at least one catch element, which can be inserted into an aperture, thereby entering a recess. A filter device with such a connecting device is also provided.

28 Claims, 5 Drawing Sheets

CONNECTING MEANS AND FILTER DEVICE WITH SUCH A CONNECTING MEANS

The present disclosure relates to the subject matter disclosed in European patent application No. 04 025 740.4 of Oct. 29, 2004, which is incorporated herein by reference in its entirety and for all purposes.

BACKGROUND OF THE INVENTION

The invention relates to a connecting means for connecting two hydraulic elements, having a first pipe connecting piece, a second pipe connecting piece and a securing part, the two pipe connecting pieces being able to be connected to one another in a releasable and fluid-tight manner by means of the securing part.

The invention also relates to a filter device with at least one connection line which can be connected to it, the filter device having a housing into which a filter unit for filtering a fluid, in particular a hydraulic fluid, can be inserted and the connection line being able to be connected to the housing in a releasable and fluid-tight manner.

Such filter devices are used, for example, for filtering hydraulic oils in hydraulic systems. For this purpose, at least one connection line can be connected to the housing, allowing the hydraulic oil to be supplied to the housing or discharged from the housing. The filter device and the connection line form a connecting means having two pipe connecting pieces which can be connected to one another in a releasable and fluid-tight manner. One of the two pipe connecting pieces may be formed on the housing of the filter device, whereas the other pipe connecting piece forms an end region of the connection line. It may be provided, for example, that a flexible hose line or a solid pipeline is connected to the pipe connecting piece of the connection line.

It is an object of the present invention to configure a connecting means of the type mentioned at the beginning in such a way that the two pipe connecting pieces can be connected to one another and separated from one another in a simple way.

SUMMARY OF THE INVENTION

This object is achieved according to the invention in the case of a connecting means of the generic type by the first pipe connecting piece having at least one recess on the outside, by the second pipe connecting piece having a collar and an outer piece of pipe, which between them form an annular space which is bounded on one side in the axial direction and accommodates a sealing element, the outer piece of pipe having at least one aperture and the first pipe connecting piece being able to be introduced into the annular space, and by the securing part having at least one catch element, which can be inserted into an aperture, thereby entering a recess.

To establish a connection between the two pipe connecting pieces, all that is required is to introduce the first pipe connecting piece into the annular space of the second pipe connecting piece and subsequently insert the at least one catch element from outside into an aperture of the outer piece of pipe, it passing through the aperture and entering a recess of the first pipe connecting piece. In this way, a fluid-tight connection between the two pipe connecting pieces can be established in a very simple way. If the two pipe connecting pieces are to be separated from one another again, all that is required for this purpose is to remove the catch element from the aperture in the radial direction, thereby releasing the recess of the first pipe connecting piece, so that the latter can be pulled out from the annular space of the second pipe connecting piece.

It is advantageous if the collar forms an inner piece of pipe of the second pipe connecting piece, which projects beyond the outer piece of pipe in the axial direction. In the case of such an embodiment, the second pipe connecting piece is of a double-walled configuration, with an outer piece of pipe and a projecting inner piece of pipe, which between them form the annular space. For insertion in the annular space, the first pipe connecting piece may be fitted onto the inner piece of pipe and subsequently introduced into the annular space in the axial direction. The inner piece of pipe may conically taper at its free end region, in order to simplify the fitting-on of the first pipe connecting piece.

The securing part preferably has at least two diametrically opposed catch elements. This allows the mechanical load-bearing capacity of the connecting means to be increased.

Alternatively or in addition, it may be provided that the securing part has at least two catch elements, disposed offset in relation to one another in the axial direction.

Associated with each catch element on the outer piece of pipe is an aperture into which it can be inserted. It is of advantage in this respect if the respective catch element forms a positive engagement with the associated aperture. This ensures that the catch element inserted into the aperture is held immovably on the outer piece of pipe of the second pipe connecting piece.

In the case of a preferred embodiment, the securing part has an elastically expandable sleeve, which can be fitted onto the outer piece of pipe and on the inside has the at least one securing element. As a result, the handling of the connecting means when establishing a releasable connection between the two pipe connecting pieces is simplified to a particular extent, since the sleeve can be fitted laterally onto the outer piece of pipe, the at least one catch element, which is disposed on the inside of the sleeve, passing through the associated aperture and entering a recess of the first pipe connecting piece. The elastic restoring force of the sleeve ensures that the catch element cannot be unintentionally released. This makes it possible to dispense with additional retaining means for the catch element.

It is of advantage if the sleeve surrounds the outer piece of pipe only incompletely in the circumferential direction, since the fitting of the sleeve onto the outer piece of pipe is simplified as a result.

It may be provided, for example, that the sleeve surrounds the outer piece of pipe in the circumferential direction over an angular range from approximately 210° to about 330°, preferably over an angular range from about 270° to approximately 330°. It has proven to be particularly advantageous if the sleeve surrounds the outer piece of pipe over an angular range of about 300°. By being configured in such a way that it surrounds the outer piece of pipe only incompletely, the sleeve has a discontinuity. For the fitting-on of the elastic sleeve, the latter can be placed laterally onto the outer piece of pipe in the region of its discontinuity and subsequently snapped into place on the outer piece of pipe, it lying in surface contact against the outer side of the outer piece of pipe and the at least one catch element disposed on the inside of the sleeve passing through an aperture of the outer piece of pipe and entering a recess of the first pipe connecting piece.

It may be provided that the at least one catch element extends in the circumferential direction over virtually the entire inner side of the sleeve. However, it has proven to be advantageous if the at least one catch element extends in the circumferential direction only over a partial region of the sleeve. For example, it may be provided that the at least one catch element extends in the circumferential direction over an angular range from approximately 20° to about 50°, in particular over an angular range from approximately 25° to about 45°.

It is of advantage if the at least one catch element is integrally connected to the sleeve. This makes low-cost production of the two parts possible.

It may be provided that at least one catch element enters a recess of the first pipe connecting piece with positive engagement. Such a configuration ensures that the first pipe connecting piece cannot be displaced in the axial direction or in the circumferential direction with respect to the second pipe connecting piece.

In many cases, it is of advantage if the two pipe connecting pieces can be turned in relation to one another in the circumferential direction while retaining their fluid-tight connection. In the case of a preferred embodiment, the at least one recess therefore extends in the circumferential direction over a greater annular range than the catch element entering the recess. In the axial direction, the catch element may form a positive engagement with a recess, so that it is ensured that the two pipe connecting pieces are connected to one another immovably in the axial direction. By contrast with this, the two pipe connecting pieces can be turned with respect to one another in the circumferential direction if the recess extends over a greater angular range than the catch element.

It may be provided, for example, that the at least one recess is configured as an annular groove encircling the pipe connecting piece in the circumferential direction.

This makes it possible to turn the two pipe connecting pieces in relation to one another in the circumferential direction by 360° while retaining a fluid-tight connection.

In the case of a preferred embodiment, interacting stops are disposed on the first and second pipe connecting pieces, the two pipe connecting pieces being able to turn with respect to one another in a first direction of rotation along their circumference when a specific torque is exceeded, with the stops being overcome, to limit the torque that can be transmitted from one of the two pipe connecting pieces to the other. In the case of such a configuration, the two pipe connecting pieces cannot be turned freely in relation to one another in the circumferential direction, but instead the stops butt against one another when the pipe connecting pieces are turned, so that a torque can be exerted on one of the two pipe connecting pieces, for example in order to screw a solid pipeline onto one of the pipe connecting pieces. If, however, the torque acting in a first direction of rotation exceeds a maximum admissible value, the stops lying against one another can be overcome, that is to say the stops slide along on one another and in this way permit a relative rotational movement of the two pipe connecting pieces in the first direction of rotation. As a result, the torque that can be transmitted from one pipe connecting piece to the other with respect to the first direction of rotation can be limited to a maximum value.

The stops can preferably only be overcome when a specific torque is exceeded in the case of a relative rotational movement of the pipe connecting pieces in the first direction of rotation, while they cannot be overcome in the case of a rotational movement in the opposite direction of rotation. This has the advantage that, for example, a solid pipeline can be screwed onto one of the two pipe connecting pieces in a first direction of rotation, the torque that can be exerted by the pipeline from the pipe connecting piece during the screwing connection being limited, since the pipe connecting piece onto which the pipeline is screwed turns with respect to the other pipe connecting piece, to which it is connected, if a specific torque is exceeded. If, however, the screwed connection is released again, by the pipeline being turned in the opposite direction, the torque that can thereby be exerted by the pipeline on the pipe connecting piece is not restricted, since, with respect to this second direction of rotation, which is opposite to the first direction of rotation, the two pipe connecting pieces cannot be turned in relation to one another as a result of the interacting stops.

It may be provided, for example, that the stops have a sawtooth-like cross-sectional profile. They may in each case have an end flank and an elongated longitudinal flank, sliding along on one another with their longitudinal flanks in the case of turning in the first direction of rotation, and the longitudinal flanks becoming increasingly clamped with respect to one another, so that an increasing torque is required for turning. If a maximum torque with respect to the first direction of rotation is exceeded, the clamping of the longitudinal flanks is abruptly released, so that the rotational movement can be continued, with the torque again increasing. This allows the two pipe connecting pieces to be turned in relation to one another, it only being possible for a restricted torque to be transmitted between the pipe connecting pieces. In the case of a rotational movement in the opposite direction, however, the two end flanks can butt against one another and represent an obstacle that cannot be overcome, so that there is no torque limitation with respect to this direction of rotation.

It is of particular advantage if the stops have a longitudinal flank curved in the form of an evolute. It has been found that particularly effective torque limitation can be achieved in this way.

In the case of a preferred embodiment, the interacting stops are disposed on the outer side of the inner piece of pipe and on the inner side of the first pipe connecting piece.

It is advantageous if the first pipe connecting piece has a number of recesses disposed offset in relation to one another in the axial direction.

It may be provided that a number of catch elements of the securing part enter a recess of the first pipe connecting piece.

The sealing element is preferably configured as a sealing ring, which is disposed in the region of the closed end of the annular space between the first pipe connecting piece and the collar or the outer piece of pipe. In this way, it may be provided that, during insertion into the annular space, the free end region of the first pipe connecting piece can be pressed in between the sealing ring and the collar or the outer piece of pipe. Positioning of the sealing ring between the first pipe connecting piece and the collar has proven to be particularly advantageous.

The sealing ring can preferably be fixed in the axial direction. For this purpose, it may be provided that it is disposed in the axial direction between a bottom wall of the annular space and an end wall portion of the first pipe connecting piece. It is of advantage if the end wall of the first pipe connecting piece forms a step, a radially outer end wall portion projecting in the direction of the second pipe connecting piece, and the sealing ring being able to be placed against a radially inner end wall portion of the first pipe connecting piece.

The securing part is preferably produced from plastic, for example from polyamide.

In the case of a preferred configuration, the two pipe connecting pieces are produced from plastic, it again being possible for polyamide to be used.

The connecting means explained above is used in particular in the case of a filter device of the type mentioned at the beginning, which can be releasably connected to at least one connection line. For this purpose, it may be provided that the filter device and the at least one connection line form a connecting means of the type explained above.

The housing of the filter device may have at least one first pipe connecting piece and/or at least one second pipe connecting piece, and the connection line that is respectively to be connected may be correspondingly configured with a second pipe connecting piece or with a first pipe connecting piece.

An outer wall of the housing is preferably integrally connected to at least one first pipe connecting piece. For this purpose, it may be provided that the housing and the at least one first pipe connecting piece are produced from plastic. It is of particular advantage if the plastic is electrically conductive, since static charges of the housing can be avoided as a result.

BRIEF DESCRIPTION OF THE DRAWINGS

The following description of a preferred embodiment of the invention provides a more detailed explanation in conjunction with the drawing, in which.

DETAILED DESCRIPTION

Figure 1:
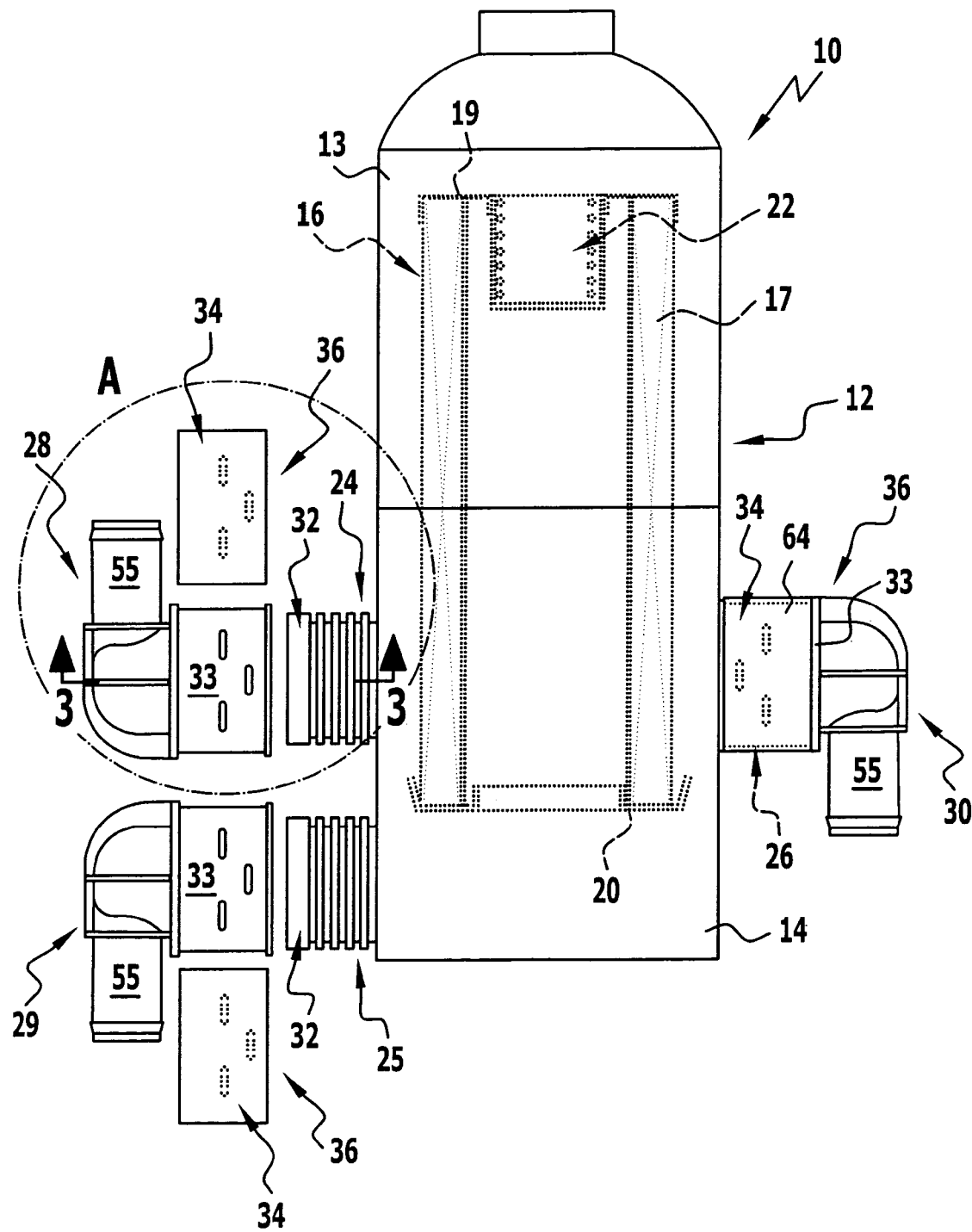
FIG. 1 shows a schematic representation of a filter device with three connection lines connected to it.

In FIG. 1, a filter device 10 is schematically represented, having a two-part housing 12, which has a first housing part 13 and a second housing part 14. The two housing parts 13, 14 are screwed to one another by means of corresponding threads, which are not represented in the drawing. They accommodate a filter element 16, which comprises a filter material 17 that is folded in a star-shaped manner in the customary way and is covered at the ends by a first end plate 19 and a second end plate 20. The first end plate 19 carries a bypass valve 22 in the customary way.

In the embodiment represented, the filter device 10 is configured as a return flow filter and is known per se to a person skilled in the art.

The housing is produced from plastic, to be precise from polyamide, and has two inlets 24, 26 and an outlet 25. To the inlets 24, 26 and the outlet 25 there can be connected in each case a connection line 28, 30 and 29, respectively. The inlets 24, 26 and the outlet 25 are of an identical configuration. They have in each case a first pipe connecting piece 32. The connection lines 28, 30, 29 are also of an identical configuration, in each case comprising a second pipe connecting piece 33. The first and second pipe connecting pieces 32, 33 respectively associated with one another can be connected to one another in a releasable and fluid-tight manner, a securing part 34 in each case being used for securing the releasable connection. In FIG. 1, the inlet 24, the outlet 25 and the connection lines 28 and 29 respectively associated with the latter as well as the respective securing part 34 are disposed offset in relation to one another, in order to illustrate the interaction of these parts, while the inlet 26 and the associated connection line 30 are represented in the state in which they are connected to one another by means of the corresponding securing part 34.

Figure 2:
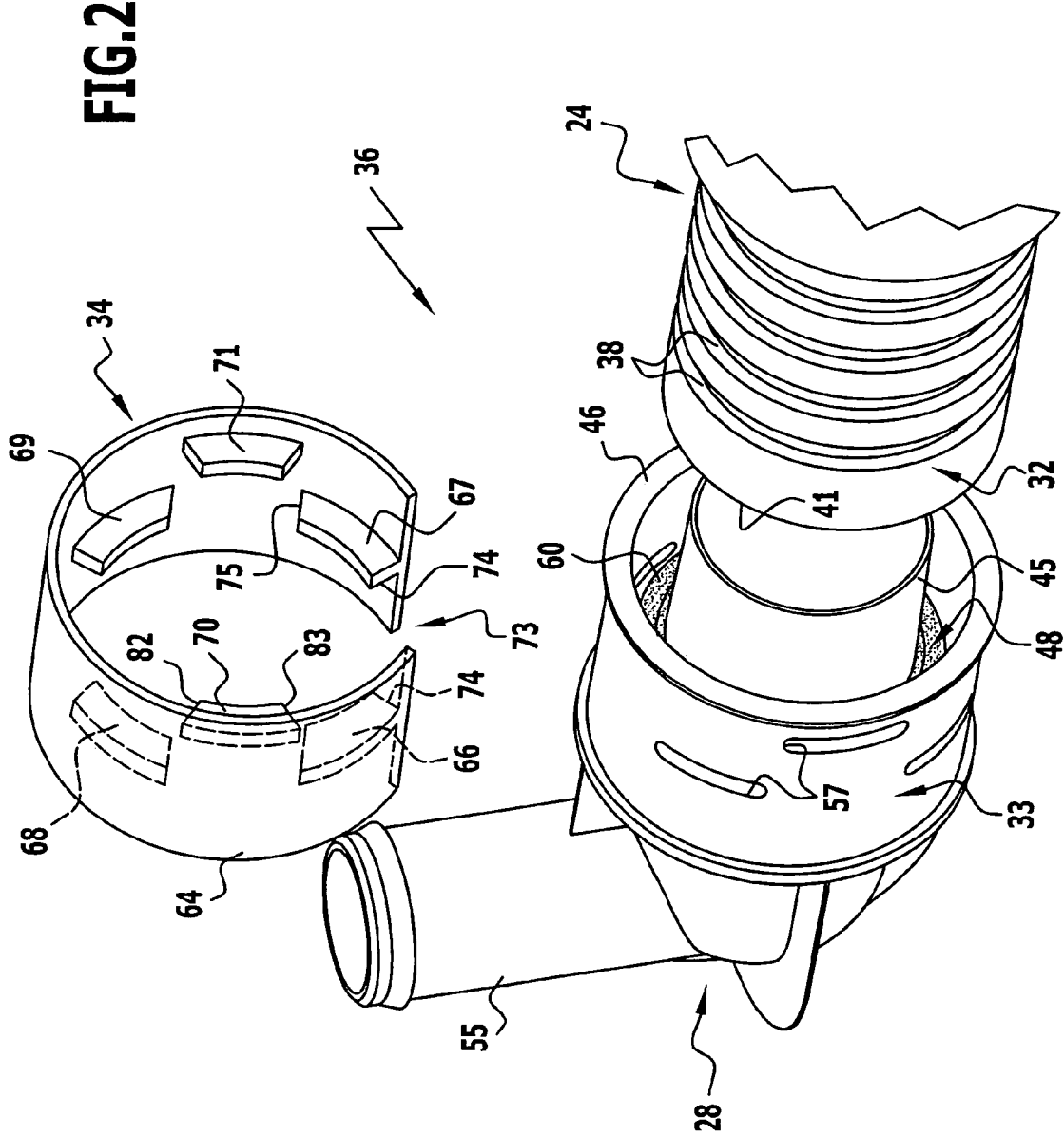
FIG. 2 shows a pictorial representation of detail A from FIG. 1.
Figure 3:
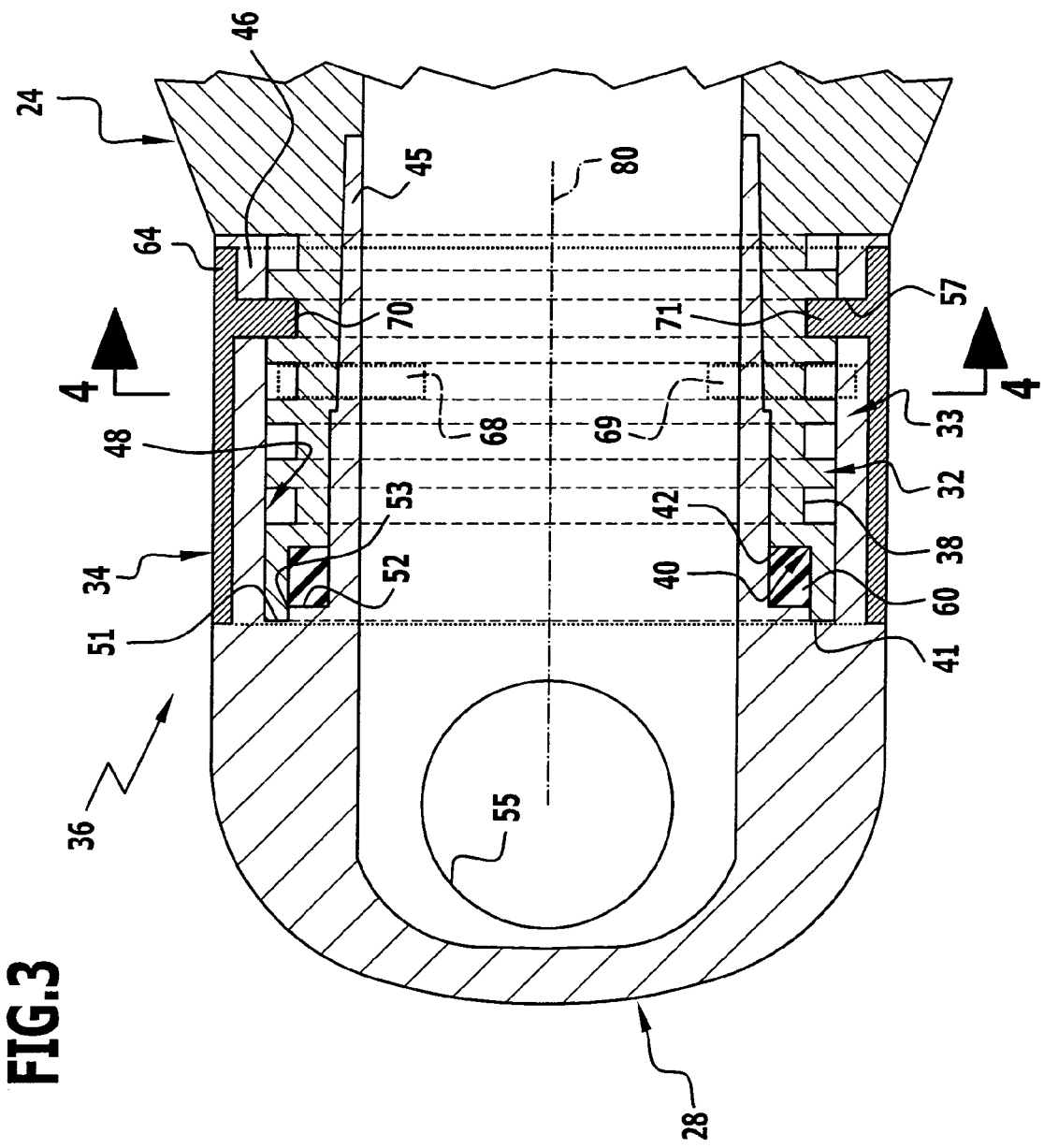
FIG. 3 shows a sectional view along the line 3-3 in FIG. 1.
Figure 4:
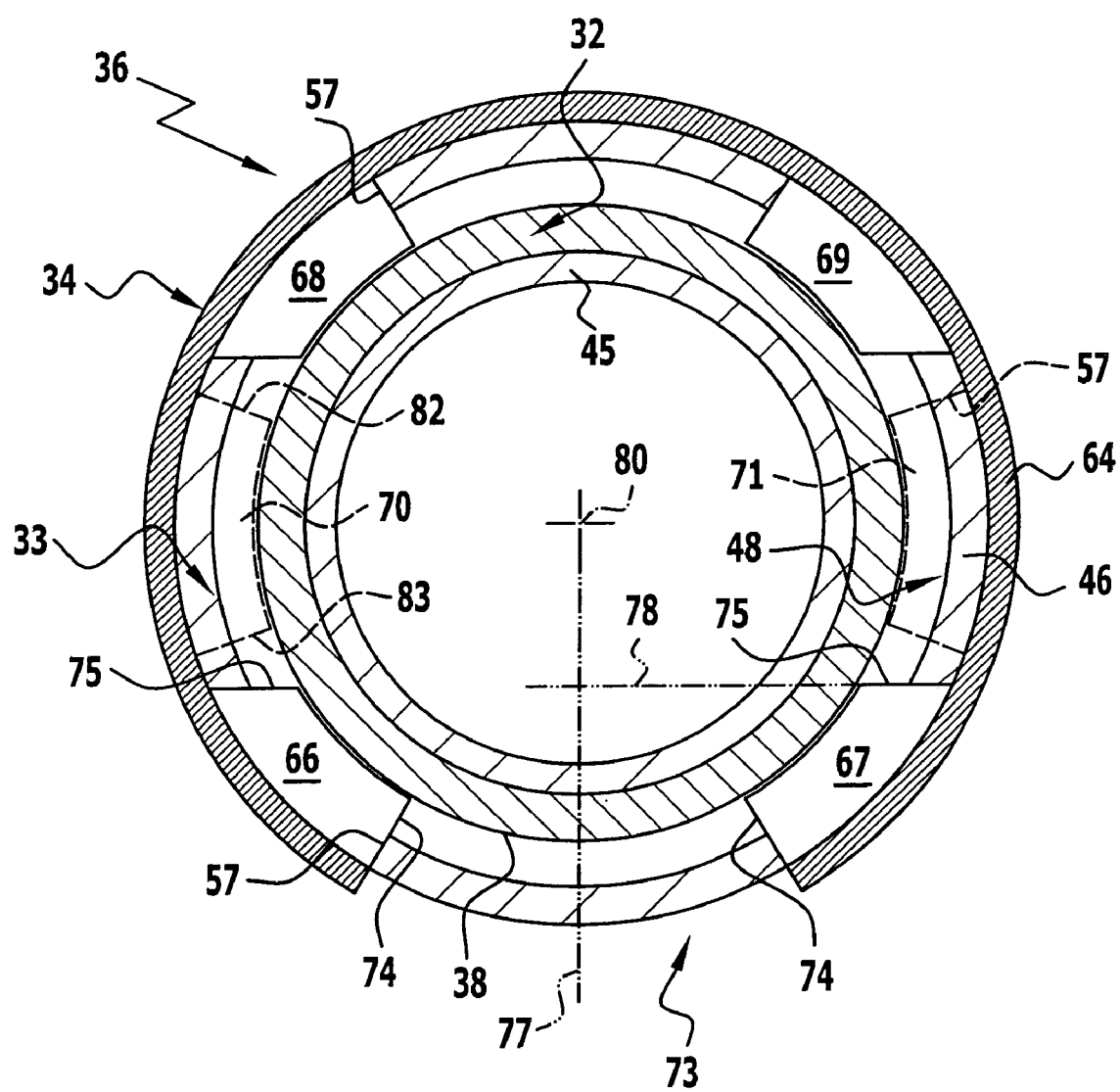
FIG. 4 shows a sectional view along the line 4-4 in FIG. 3.

The interacting first and second pipe connecting pieces 32, 33 in combination with the respective securing part 34 form a connecting means 36, which is represented in detail in FIGS. 2, 3 and 4 and with the aid of which the inlets and outlets 24, 25, 26 can in each case be connected to a connection line 28, 29 and 30, respectively, in a releasable and fluid-tight manner.

The first pipe connecting piece 32 has on the outside a number of annular grooves 38, which are disposed at equal intervals in relation to one another and in each case form a recess. At its free end, the first pipe connecting piece 32 has an inner groove 40, by which the free end wall of the first pipe connecting piece 32 is provided with a stepped configuration, with a radially outer first end wall portion 41 and a radially inner second end wall portion 42, which is disposed offset in relation to the first end wall portion 41 in the axial direction.

The second pipe connecting piece 33 comprises an axially aligned collar in the form of an inner piece of pipe 45 and a coaxially aligned outer piece of pipe 46, which define between them an annular space 48, which is closed on the side remote from the first pipe connecting piece 32 by means of a bottom wall of a stepped configuration. The bottom wall has a radially outer first bottom wall portion 51 and a radially inner second bottom wall portion 52, which are connected to one another by means of a step 53. In the region of the bottom wall portions 51 and 52, the inner piece of pipe 45 and the outer piece of pipe 46 merge integrally with one another and together form a connection pipe 55, which in the embodiment represented protrudes at right angles from the second piece of pipe 33 and to which, for example, a flexible hose line known per se can be connected.

The outer piece of pipe 46 has a total of six apertures 57. Four of the apertures 57, diametrically opposed in twos, are disposed at the same level in the axial direction and evenly distributed in the circumferential direction of the outer piece of pipe 46. Two further apertures 57 are disposed offset in the axial direction and in the circumferential direction in relation to the remaining apertures 57 and are likewise diametrically opposed. The apertures 57 are configured in the form of slits and extend in the circumferential direction of the outer piece of pipe 26 over an angular range from approximately 35° to 40°.

The annular space 48 accommodates a sealing ring 60, which surrounds the inner piece of pipe 45 in the circumferential direction and lies against the radially inner bottom wall portion 52, it only extending in the radial direction to the level of the step 53, so that an intermediate space remains free between the sealing ring 60 and the outer piece of pipe 46.

As can be seen particularly clearly from FIGS. 3 and 4, the second pipe connecting piece 33 can be fitted onto the first pipe connecting piece 32, the first pipe connecting piece 32 entering the annular space 48. The inner piece of pipe 45 projects in the axial direction beyond the outer piece of pipe 46. This facilitates the insertion of the first pipe connecting piece 32 into the annular space 48. The free end region of the first pipe connecting piece 32 enters the intermediate space between the sealing ring 60 and the outer piece of pipe 46, so that the sealing ring 60 lies with its end face, remote from the second bottom wall portion 52, against the second end wall portion 42 of the first pipe connecting piece 32. The thickness of the sealing ring 60 is chosen such that, when the first pipe connecting piece 32 is inserted into the annular space 48, it is pressed with a fluid-tight effect by the end region of the first pipe connecting piece 32 and by the circumferential region of the inner piece of pipe 45 that is adjacent the second bottom wall portion 52.

The apertures 57 of the outer piece of pipe 46 are disposed in the axial direction in such a way that they are in each case in line with an annular groove 38 when the first pipe connecting piece 32 is inserted in the annular space 48.

The securing element 34, which comprises a sleeve 64 extending in the circumferential direction over an angular range of approximately 300°, is used for the axial fixing of the two pipe connecting pieces 32, 33. The sleeve 64 has on the inside a total of six catch elements in the form of radially inwardly directed projections 66, 67, 68, 69, 70, 71, which are in each case associated with an aperture 57 of the outer pipe connecting piece 46.

Since the sleeve 64 extends in the circumferential direction only over a partial region of the outer piece of pipe 46, with its free ends it defines a clearance 73 in the circumferential direction. The clearance 73 is respectively adjoined on the inner side of the sleeve 64 by a projection 66 and 67, which has directly adjacent the clearance 73 a radially extending first side edge 74 and a second side edge 75, which is remote from the first side edge 74 and runs in a colinear manner in relation to a secant 78 aligned perpendicularly in relation to the angle bisector 77 of the clearance 73.

The projections 66, 67, 68 and 69 are disposed at the same level in the axial direction, the projection 69 being located diametrically opposite the projection 66 and being configured mirror-symmetrically in relation to the projection 66 with respect to a center axis 80 of the sleeve 64. In a corresponding way, the projection 68 lies diametrically opposite the projection 67 and is configured mirror-symmetrically in relation to the projection 67 with respect to the center axis 80.

The projections 70 and 71 are disposed offset in relation to the projections 66 to 69 axially in the direction of the free end of the second pipe connecting piece 33 and centrally between the projections 66 and 68 or 67 and 69 in the circumferential direction, and are likewise aligned mirror-symmetrically in relation to one another with respect to the center axis 80, having radially extending first and second side edges 82 and 83, respectively.

With the clearance 73, the securing pipe 34 can be placed laterally against the outer piece of pipe 46 of the second pipe connecting piece 33. Being formed from plastic material allows it subsequently to be snapped into place on the outer piece of pipe 46, by the sleeve 64 radially expanding and subsequently contracting again in the radial direction, the projections 66 to 71 in each case reaching through an associated aperture 57 of the outer piece of pipe 46 and entering one of the annular grooves 38 of the first pipe connecting piece 32. The first pipe connecting piece 32 is thereby held non-displaceably in the axial direction on the second pipe connecting piece 33, while the two pipe connecting pieces 32 and 33 can be turned with respect to one another in the circumferential direction, without the fluid-tight connection of the two pipe connecting pieces 32, 33 being impaired as a result. This makes it possible when fitting the filter device 10 and the connection lines 28, 29, 30 in an installation space to align the connection lines 28, 29 and 30 optimally in relation to the filter device 10 in a way corresponding to the space available.

If the connection between the pipe connecting pieces 32 and 33 is to be released again, all that is required for this purpose is to detach the securing part 34 laterally from the outer piece of pipe 46 of the second pipe connecting piece 33, by the sleeve 64 being radially expanded. Consequently, by means of the securing part 34, a fluid-tight connection between the pipe connecting pieces 32 and 33 can be established and also separated again in a simple way and without the assistance of an additional tool.

Figure 5:
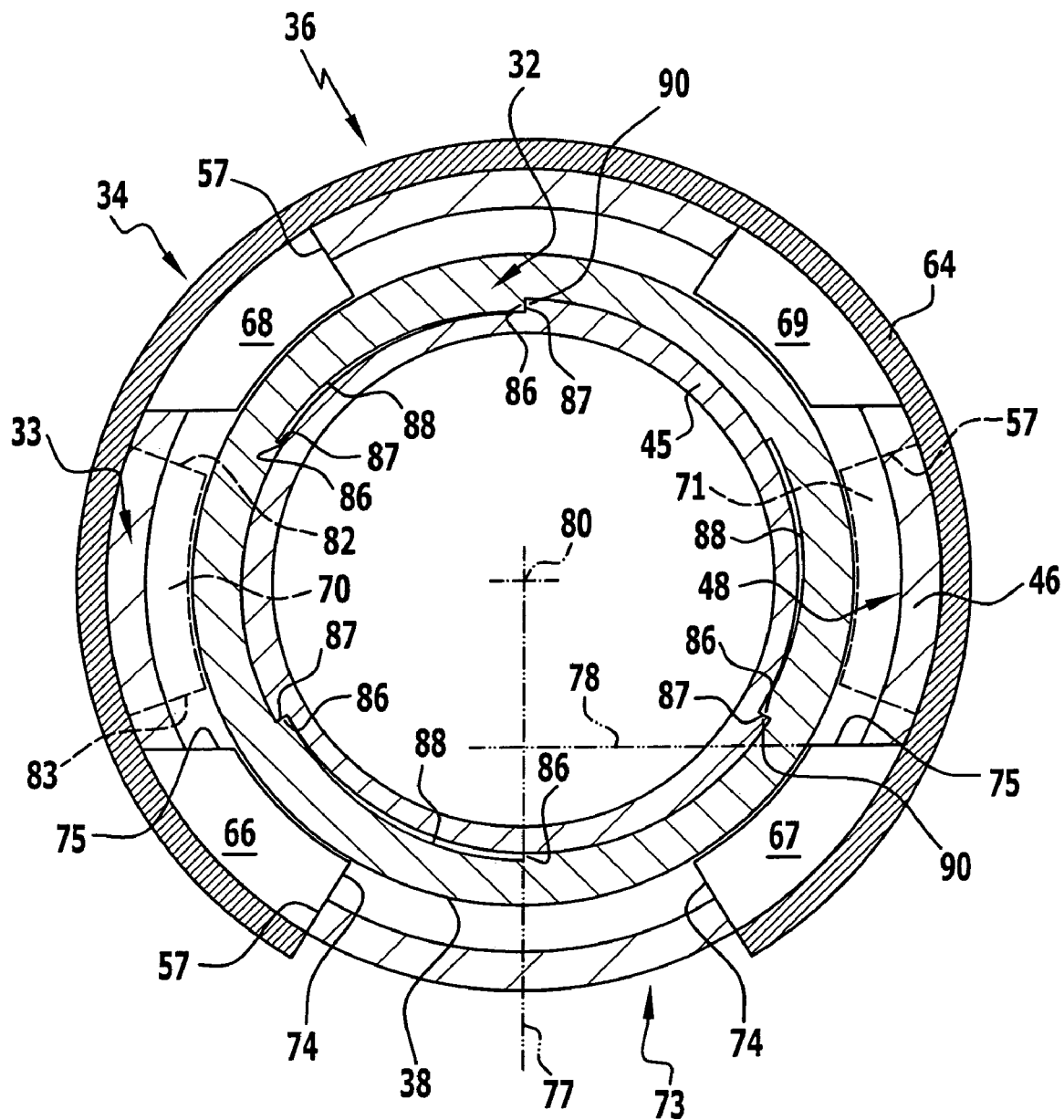
FIG. 5 shows a sectional view corresponding to FIG. 4 of an alternative configuration.

As already explained, in the case of the embodiment explained in detail above, the two pipe connecting pieces 32, 33 can be freely turned in relation to one another in the circumferential direction. Schematically represented in FIG. 5 is an alternative configuration, which is largely identical to the embodiment described in detail above, as it is illustrated in FIGS. 1 to 4. Therefore, reference numerals identical to those in FIGS. 1 to 4 are used for the same components in FIG. 5. To avoid repetition, in this respect reference is made to the explanations given above.

The configuration that is schematically shown FIG. 5 differs from the embodiment that is represented in FIGS. 1 to 4 in that the first pipe connecting piece 32 has on its inner side a number of radially inwardly directed stops 86, which are disposed evenly distributed in the circumferential direction and have a sawtooth-like profile, with an end flank 87 which is inclined obliquely in relation to the radial direction and is adjoined in the circumferential direction by an elongated longitudinal flank 88 curved in the form of an evolute. Altogether, the first pipe connecting piece 32 has six stops 86, disposed at equal angular intervals in relation to one another. Corresponding stops 90 are disposed at equal intervals in relation to one another on the outer side of the inner piece of pipe 45. However, the inner piece of pipe 45 has only three stops 90, these likewise having an end flank which is inclined obliquely in relation to the radial direction and is adjoined by an elongated longitudinal flank in the form of an evolute.

If, in the case of the embodiment that is represented in FIG. 5, the two pipe connecting pieces 32, 33 are turned with respect to one another in a first direction of rotation, the mutually facing end faces of the associated stops 86 and 90 being moved away from one another, there is a turning movement counter to the resistance of the longitudinal flanks 88 curved in the form of an evolute sliding on one another, which become increasingly clamped with respect to one another. The resistance, and consequently the torque required for the rotational movement, consequently becomes increasingly greater. If, however, the torque acting with respect to the first direction of rotation is increased beyond a maximum value, the end flanks 87 of the stops 86, 90 that are inclined obliquely in relation to the radial direction slide along on one another in the first direction of rotation and thereby release the longitudinal flanks 88 again, that is to say the stops 86, 90 can be overcome in the first direction of rotation, and consequently only a limited torque can be transmitted between the pipe connecting pieces 32 and 33 with respect to the first direction of rotation. If the two pipe connecting pieces 32, 33 are turned with respect to one another in the second direction of rotation, opposite to the first direction of rotation, the mutually facing end faces 87 of the stops 88, 90 butt against one another, that is to say the stops 86, 90 cannot be overcome in the second direction of rotation.

Such an embodiment is of advantage in particular whenever, for example, the second pipe connecting piece 33 is part of a connection element which can be screwed on its side remote from the first pipe connecting piece 32 to a line part, for example a solid pipeline, which is aligned coaxially in relation to the second pipe connecting piece 33. During the screwing of the line part onto the connection element, the connection element experiences a torque with respect to the first direction of rotation and can be supported on the first pipe connecting piece 32 via the second pipe connecting piece 33 by means of the stops 86 and 90. If, however, the torque acting exceeds a maximum value, the first pipe connecting piece 32 releases the second pipe connecting piece 33 in the first direction of rotation, that is to say the two pipe connecting pieces 32, 33 can be turned with respect to one another, and this in turn ensures that, when the line part is screwed onto the connection element, the latter cannot be damaged as a result of an inadmissibly high torque. If the screw connection is released again, by the line part being turned in the second direction of rotation, opposite to the first direction of rotation, the second pipe connecting piece 33 can be supported on the first pipe connecting piece 32 via the stops 86, 90 which cannot be overcome in this direction of rotation.

what is claimed is:

1. Connecting means for connecting two hydraulic elements, comprising:
    a first pipe connecting piece,
    a second pipe connecting pieces, and
    a securing part,
    the first and second pipe connecting pieces adapted to be connected to one another in a releasable and fluid-tight manner by means of the securing part,
    wherein:
        the first pipe connecting piece has at least one recess on an outside,
        the second pipe connecting piece has a collar and an outer piece of pipe,
        an annular space is formed between the collar and the outer piece of pipe, which annular space is bounded on one side in an axial direction and accommodates a sealing element,
        the outer piece of pipe has at least one aperture,
        the first pipe connecting piece is adapted to be introduced into the annular space,
        the securing part has at least two catch elements, each of which can be inserted into an associated one of the at least one apertures, thereby entering said at least one recess, and
        the least two catch elements are disposed offset in relation to one another in the axial direction.

2. Connecting means according to claim 1, wherein the collar forms an inner piece of pipe, which projects beyond the outer piece of pipe in the axial direction.

3. Connecting means according to claim 1, wherein each of the at least two catch elements forms a positive engagement with the associated aperture.

4. Connecting means according to claim 1, wherein the at least one recess extends in a circumferential direction over a greater angular range than the catch element entering the recess.

5. Connecting means according to claim 1, wherein the at least one recess is configured as an annular groove encircling the first pipe connecting piece in a circumferential direction.

6. Connecting means according to claim 1, wherein the first pipe connecting piece has a number of said recesses disposed offset in relation to one another in the axial direction.

7. Connecting means according claim 1, wherein the sealing element is configured as a sealing ring, which is disposed in a region of a closed end of the annular space between the first pipe connecting piece and the collar or the outer piece of pipe.

8. Connecting means according to claim 7, wherein the sealing ring is disposed in the axial direction between a bottom wall portion of the annular space and an end wall portion of the first pipe connecting piece.

9. Connecting means according to claim 1, wherein the securing part is produced from plastic.

10. Connecting means according to claim 1, wherein the two pipe connecting pieces are produced from plastic.

11. Connecting means for connecting two hydraulic elements, comprising:
    a first pipe connecting piece,
    a second pipe connecting piece, and
    a securing part,
    the first and second pipe connecting pieces adapted to be connected to one another in a releasable and fluid-tight manner by means of the securing part,
    wherein:
        the first pipe connecting piece has at least one recess on an outside,
        the second pipe connecting piece has a collar and an outer piece of pipe,
        an annular space is formed between the collar and the outer piece of pipe, which annular space is bounded on one side in an axial direction and accommodates a sealing element,
        the outer piece of pipe has at least one aperture,
        the first pipe connecting piece is adapted to be introduced into the annular space,
        the securing part has at least one catch element, which can be inserted into an associated one of the at least one apertures, thereby entering said at least one recess, and
        the securing part has an elastically expandable sleeve, which sleeve can be fitted onto the outer piece of pipe and on an inside has the at least one catch element.

12. Connecting means according to claim 11, wherein the securing part has at least two diametrically opposed catch elements.

13. Connecting means according to claim 11, wherein the securing part has at least two catch elements, disposed offset in relation to one another in the axial direction.

14. Connecting means according to claim 11, wherein the sleeve surrounds the outer piece of pipe incompletely in a circumferential direction.

15. Connecting means according to claim 14, wherein the sleeve surrounds the outer piece of pipe in the circumferential direction over an angular range from approximately 210° to approximately 330°.

16. Connecting means according to claim 14, wherein the at least one catch element extends in the circumferential direction over a partial region of the sleeve.

17. Connecting means according to claim 16, wherein the at least one catch element extends in the circumferential direction over an angular range from approximately 20° to approximately 50°.

18. Connecting means according to claim 11, wherein the at least one catch element is integrally connected to the sleeve.

19. Connecting means for connecting two hydraulic elements, comprising:
    a first pipe connecting piece,
    a second pipe connecting piece, and
    a securing part,
    the first and second pipe connecting pieces adapted to be connected to one another in a releasable and fluid-tight manner by means of the securing part,
    wherein:
        the first pipe connecting piece has at least one recess on an outside,
        the second pipe connecting piece has a collar and an outer piece of pipe,
        an annular space is formed between the collar and the outer piece of pipe, which annular space is bounded on one side in an axial direction and accommodates a sealing element,
        the outer piece of pipe has at least one aperture,
        the first pipe connecting piece is adapted to be introduced into the annular space,
        the securing part has at least one catch element, which can be inserted into an associated one of the at least one apertures, thereby entering said at least one recess, and interacting stops are disposed on the first and second pipe connecting pieces, the first and second pipe connecting pieces adapted to turn with respect to one another in a first direction of rotation along their circumference when a specific torque is exceeded, with the stops being overcome, to limit an amount of torque that can be transmitted from one of the first and second pipe connecting pieces to the other of the first and second pipe connection pieces.

20. Connecting means according to claim 19, wherein:
the interacting stops can only be overcome when a specific torque is exceeded with a relative rotational movement of the pipe connecting pieces in the first direction of rotation,
the interacting stops cannot be overcome with a rotational movement of the pipe connecting pieces in a direction of rotation opposite the first direction.

21. Connecting means according to claim 19, wherein the stops have a sawtooth-like cross-sectional profile.

22. Connecting means according to claim 19, wherein the stops have a longitudinal flank curved in a form of an evolute.

23. Connecting means according to claim 19, wherein the stops are disposed on an outer side of the inner piece of pipe and an inner side of the first pipe connecting piece.

24. Filter device and connection line which can be connected to it, the filter device having a housing into which a filter unit for filtering a fluid can be inserted, and the connection line adapted to be connected to the housing in a releasable and fluid-tight manner, the filter device and the connection line forming a connecting means, the connecting means comprising:
a first pipe connecting piece,
a second pipe connecting piece, and
a securing part,
the first and second pipe connecting pieces adapted to be connected to one another in a releasable and fluid-tight manner by means of the securing part,
wherein:
the first pipe connecting piece has at least one recess on an outside,
the second Pipe connecting piece has a collar and an outer piece of pipe,
an annular space is formed between the collar and the outer piece of pipe, which annular space is bounded on one side in an axial direction and accommodates a sealing element,
the outer piece of pipe has at least one aperture,
the first pipe connecting piece is adapted to be introduced into the annular space,
the securing part has at least two catch elements, each of which can be inserted into an associated one of the at least one apertures, thereby entering said at least one recess, and
the least two catch elements are disposed offset in relation to one another in the axial direction.

25. Filter device and connection line which can be connected to it according to claim 24, the housing having at least one first pipe connecting piece.

26. Filter device and connection line which can be connected to it according to claim 24, wherein the connection line comprises the second pipe connecting piece.

27. Filter device and connection line which can be connected to it according to claim 24, wherein the housing is produced from plastic.

28. Filter device and connection line which can be connected to it according to claim 24, wherein the connection line is produced from plastic.

* * * * *